United States Patent Office 3,413,382
Patented Nov. 26, 1968

3,413,382
ARYLSULFONYLCARBAMOYLPHOSPHONATES
Henri Ulrich, North Branford, Conn., asssignor to The Upjohn Company, Kalamazoo, Mich., a corporation of Delaware
No Drawing. Filed Jan. 10, 1966, Ser. No. 519,466
10 Claims. (Cl. 260—943)

This invention relates to novel chemical compounds and to methods for their use in the control of fungi and is more particularly concerned with novel arylsulfonylcarbamoylphosphonates and with methods for their use in the control of fungi.

The novel compounds of the invention are represented by the formula:

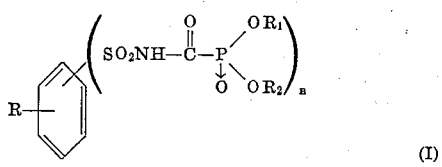

(I)

wherein $R_1$ and $R_2$ taken individually represent lower-hydrocarbyl and $R_1$ and $R_2$ taken together represent alkylene from 2 to 10 carbon atoms, inclusive, bridging the oxygen atoms to which $R_1$ and $R_2$ are attached, $n$ is an integer from 1 to 3 and R represents from 0 to 3 substituents selected from the group consisting of halo, lower-alkyl, lower-alkenyl, lower-alkoxy, lower-alkenyloxy, lower-alkylmercapto, nitro, cyano, and benzo.

The term "lower-hydrocarbyl" means the monovalent radical obtained by removing one hydrogen atom from the parent hydrocarbon which latter contains from 1 to 12 carbon atoms. Illustrative of lower-hydrocarbyl are alkyl such as methyl, ethyl, propyl, butyl, pentyl, hexyl, heptyl, octyl, nonyl, decyl, undecyl, dodecyl, including isomeric forms thereof; aralkyl such as benzyl, phenethyl, phenylpropyl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like including isomeric forms thereof; cycloalkenyl such as cyclopentenyl, cyclohexenyl, cycloheptenyl, and the like, including isomeric forms thereof.

The term "alkylene from 2 to 10 carbon atoms, inclusive" means a divalent aliphatic saturated hydrocarbon moiety of the stated carbon atom content, for example, ethylene, 1,3-propylene, 1,2-propylene, 1,4-butylene, 2-ethyl-1,3-butylene, 2,4-hexylene, 1,5-octylene, 4,5-decylene, and the like.

The term "lower-alkyl" means alkyl containing from 1 to 12 carbon atoms, inclusive, as defined and exemplified above. The term "lower-alkenyl" means alkenyl from 2 to 12 carbon atoms, inclusive, as defined and exemplified above. The term "lower-alkoxy" means alkoxy containing from 1 to 12 carbon atoms, inclusive, such as methoxy, ethoxy, propoxy, butoxy, pentyloxy, hexyloxy, heptoyloxy, octyloxy, nonyloxy, decloxy, undecyloxy, dodecyloxy, and isomeric forms thereof. The term "lower-alkenyloxy" means alkenyloxy containing from 2 to 12 carbon atoms, inclusive, such as vinyloxy, allyloxy, butenyloxy, pentenyloxy, hexenyloxy, heptenyloxy, octenyloxy, nonenyloxy, decenyloxy, undecenyloxy, dodecenyloxy, and isomeric forms thereof. The term "lower-alkylmercapto" means alkylmercapto containing from 1 to 12 carbon atoms, inclusive, such as methylmercapto, ethylmercapto, propylmercapto, butylmercapto, pentylmercapto, hexylmercapto, heptylmercapto, octylmercapto, nonylmercapto, decylmercapto, undecylmercapto, dodecylmercapto, and isomeric forms thereof. The term "halo" has its conventional meaning as inclusive of fluorine, chlorine, bromine, and iodine.

The novel compounds of the invention can exist in the free form as shown in Formula I and, by virtue of the acidic hydrogen attached to nitrogen in the carbamoyl group, in the form of salts. Said salts can be those with alkali metals such as sodium, potassium, lithium and the like, alkaline earth metal such as calcium, strontium, barium and the like, ammonia, and organic amines, for example alkylamines such as methylamine, dipropylamine, N-ethyl-N-methylamine, N-ethyl-N-hexylamine, trimethylamine, triethylamine and the like, cycloalkylamines such as cyclopropylamine, cyclobutylamine, cyclopentylamine, cyclohexylamine, N-methylcyclohexylamine and the like; aralkylamines such as benzylamine, phenethylamine, phenylpropylamine, benzhydrylamine, N-methylbenzylamine, N-isobutylbenzylamine, and the like; arylamines such as aniline, o-, m-, p-toluidine, o-, m-, and p-xylidine, α-naphthylamine, N-methylaniline, N-isopropylaniline, N-hexylaniline, N-methyl-p-toluidine, and the like; alkanolamines such as ethanolamine, propanolamine, diethanolamine, triethanolamine, and the like; heterocyclic amines such as pyrrolidine, piperidine, piperazine morpholine, and alkyl derivatives thereof; and amines of all the above types in which one or more of the carbon atoms is substituted by an inert substituent such as alkoxy, aralkoxy, aryloxy, alkenoxy, alkylmercapto, aralkylmercapto, arylmercapto, carbalkoxy, epoxy, alkylenedioxy, carboxamido, and the like.

It is to be understood that when reference is made throughout this specification to the compounds of the invention having the Formula I said reference includes therein the aforesaid salts as well as the free form of said compounds.

The novel compounds of the invention having the Formula I are effective in the control of a broad spectrum of fungi which attack living plants including those fungi which are seed-borne and soil-borne. Illustratively, the compounds of the invention having the Formula I are active against fungi of the genera Alternaria, Botrytis, Candida, Cephalosporium, Cladosporium, Fusarium, Glomerella, Helminothosporium, Monilinia, Penicillium, Phytophthora, Pythium, Rhizoctonia, Sclerotinia, Stemphylium, Thielaviopsis, Trichodermia and Verticillium. Representative species of said genera are *Alternaria solani, Botrytis cinerea,* Candida sp., Cephalosporium sp., Cladosporium sp., *Fusarium oxysporum f. lycopersici, Fusarium oxysporum f. cubense, Fusarium roseum, Glomerella cingulata,* Helminthosporium sp., *Monilinia fructicola, Penicillium patulum, Phytophthora cinnamomi, Pythium ultimum, Rhizoctonia solani, Sclerotinia scierotiorum, Stemphylium sarcinaeforme* Thielaviopsis sp., Trichoderma sp., *Verticillium albo-atrum.*

Accordingly the novel compounds of the invention having the Formula I can be employed in the treatment and control of fungal infestations in growing plants and in seeds and soil. For this purpose the compounds of the invention are formulated in accordance with conventional procedures, as discussed in more detail hereinafter and are applied at rates and concentrations which vary according to the particular site to be treated. Illustratively in the treatment of growing plants, the compounds of the invention are applied in concentrations of the order of about 20 p.p.m. to about 20,000 p.p.m. depending on the type of formulation and the spraying equipment employed. In the treatment of seeds the compounds of the invention are generally applied at a rate of about 0.25 ounces to about 10 ounces per bushel of seed and preferably at a rate within the range of about 2 ounces to about 6 ounces per bushel of seed. In the treatment of soil, the compounds of the invention are applied at the rate of about 1 pound to about 150 pounds per acre and preferably at at a rate of about 10 pounds to about 50 pounds per acre.

The present invention therefore includes, in addition to the novel compounds of Formula I, a process for the control of fungal infestations in growing plants, soil, seeds and the like and compositions adapted for said control containing as active ingredient a compound having the Formula I above.

The fungicidal compositions of the invention comprise dusts, dispersible powders, aqueous dispersions, emulsifiable concentrates, and oil-in-water emulsions and granular preparations in which a compound having the Formula I is present as the active fungicidal agent.

The fungicidal dusts of the invention comprise a compound having the Formula I dispersed in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously less than 15 microns.

The fungicidal dusts of the invention can be prepared more conveniently by adding to the solid diluent a solution of the Compound I in a volatile solvent such as ethanol, acetone, ether, and the like, mixing to form a paste, drying, and milling.

The amount of compound having the Formula I present in the dusting powders is advantageously of the order of about 1 percent to about 90 percent and is preferably of the order of about 5 percent to about 25 percent by weight. However, in the case of those compounds having the Formula I which are ordinarily oils the upper limit of concentration of compound in the dusting powders of the invention is lower and is generally of the order of 60 percent by weight.

The fungicidal dusts prepared as described above are particularly suitable for the treatment of growing plants and seeds but can also be used in the treatment of soil. When so used in the treatment of soil, the fungicidal dusts of the invention can also include solid fertilizers in order that fertilization and treatment of the soil to control fungi can be accomplished in a single operation.

The dispersible powders of the invention comprise a compound having the Formula I, an inert dusting powder as hereinbefore defined, and a surfactant. As surfactant there can be used any of the conventional wetting and dispersing agents of the anionic, cationic, and nonionic types that are commonly employed in compositions for controlling fungal infections in horticulture and agriculture. Suitable surfactants having sufficient wetting and/or dispersing activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether alcohols, alkylnaphthalenesulfonates, alkyl quatenary ammonium salts, sulfated fatty acid esters, sulfated fatty acid amides, glycerol mannitan laurate, polyalkylether condensates of fatty acids, and ligninsulfonates, the sulfates and sulfonates, of course, being used in the form of their soluble salts, for example, the sodium salts. All these surfactants are capable of reducing the surface tension of water to less than about 40 dynes per cm. in concentrations of about 1 percent or less.

The concentration of compound having the Formula I present in the dispersible powders is of the same order as in the dusts described above.

The aqueous dispersions of the invention comprise a compound having the Formula I, a surfactant, and water and can be prepared by diluting the above-described dispersible powders with water, or by dissolving a compound having the Formula I in a water miscible solvent such as acetone, dimethylformamide, dimethyl sulfoxide, and the like, containing a surfactant, and pouring the resulting solution into water. The aqueous dispersions so obtained can be used in the treatment of seeds, the seeds being dried after treatment, or more suitably, can be employed in the treatment of growing plants and soil for the control of fungal infestations. The concentration of compound having the Formula I which is present in the aqueous dispersion for the treatment of growing plants and soil can be varied over a wide range to meet the needs of the spraying machine employed in the application thereof; advantageously, the concentration of compound having the Formula I in the aqueous dispersion falls within the range of about 500 p.p.m. and about 10,000 p.p.m. When the aqueous dispersions are employed for the treatment of seed, the concentration of compound having the Formula I is generally higher, and advantageously is of the order of 5 to 45 percent by weight.

The compositions of the invention also include emulsified concentrates and the oil-in-water emulsions obtained by pouring said concentrates into water. The emulsifiable concentrates comprise a compound having the Formula I in solution in a mixture of a surfactant and a water immiscible solvent such as cyclohexanone, aromatic hydrocarbons, for example benzene, toluene, xylene, and the like, and high-boiling petroleum hydrocarbons such as kerosene, diesel oil, and the like. The concentration of compound having the Formula I in the emulsifiable concentrates is advantageously of the order of about 20 percent to about 80 percent by weight. The concentration of compound having the Formula I in the oil-in-water emulsions obtained by diluting the emulsifiable concentrates with water can be varied over a wide range to meet the needs of the spraying machine employed in the application thereof. Advantageously, the concentration of compound having the formula I in the oil-in-water emulsions falls within the range of about 500 p.p.m. to about 10,000 p.p.m.

The oil-in-water emulsions of the invention are particularly suitable in the treatment of soil for the control of fungal infestations. Both the aqueous dispersions and the oil-in-water emulsions can be applied to soil using conventional spraying machines of the land-borne or air-borne type.

Advantageously, the oil-in-water emulsions and the aqueous dispersions are applied to the soil at the time at which the seeds are planted or shortly after the seeds have been planted. Thus the liquid formulations can be applied to the furrow in which the seeds are to be planted, the application of the liquid formulation and the planting of the seeds being accomplished in a continuous operation. Alternatively, after the seeds have been planted, the liquid formulations can also be applied as soil drenches by methods known in the art.

The granular compositions of the invention comprise a compound having the Formula I absorbed in an inert carrier in granular form. Examples of such granulated carriers are attapulgite, vermiculite, comminuted corn husks, sand and the like having a particle size such that all the particles will pass through a 40–60 mesh screen. The active ingredient of Formula I is adsorbed on the carrier in a convenient manner by admixing the carrier and a solution of Compound I in a volatile organic solvent and subsequent allowing the volatile solvent to evaporate. Advantageously the solution of Compound I in volatile organic solvent is sprayed on to the stirred carrier. Suitable volatile organic solvents are methylene chloride, acetone, diethyl ether, ethanol and methanol. Alternatively, the Compound I can be applied to the granular carrier by admixing the carrier with a suspension of Compound I in a non-volatile liquid or waxy solid such as mineral oil, diethylene glycol, carbowax and the like, which together with Compound I is absorbed on the carrier. The concentration of Compound I in the granular compositions, by whichevere method these are made, is advantageously within the range of about 1 percent to about 50 percent by weight, preferably from about 4 to about 20 percent by weight.

The compositions of the invention also include compositions in whicn a compound having the Formula I is employed in combination with known fungicides. Such known fungicides include N-(trichloromethylthio)-1,2,3,6-tetrahydrophthalimide (captan), 3-[2-(3,5-dimethyl-2- oxocyclohexyl)-2-hydroxyethyl] glutarimide (cyclohexi-mide), 2,3-dichloro-1,4-naphthoquinone (dichlone), te-trachloro-p-benzoquinone (chloranil), pentachloronitro-benzene, ferric dimethyldithiocarbamate (Ferbam), di-sodium ethylene bis[dithiocarbamate] (Nabam), man-ganous ethylene-bis[dithiocarbamate] (Maneb), zinc ethylenebis[dithiocarbamate] (Zineb), tetramethylthi-uram disulfide, hexachlorophene [2,2'-methylenebis(3,4, 6-trichlorophenol)], and the like.

The novel compounds having the Formula I in the free form (i.e. as opposed to the salts of said compound with alkali metals, alkaline earth metals, ammonia, amines and the like) can be prepared conveniently by reaction of the corresponding sulfonylisocyanates having the formula:

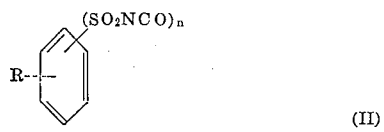

wherein R and $n$ have the significance hereinbefore de-fined, with the appropriate phosphite having the formula:

wherein $R_1$ and $R_2$ have the significance hereinbefore de-fined. Advantageously the reaction is carried out by bring-ing the reactants together in the presence of an inert organic solvent such as benzene, toluene, xylene, petrole-um ether, hexanes, chlorobenzene, dichlorobenzene, deca-lin, tetralin, and the like. The sulfonyl isocyanate (II) and the phosphite (III) are generally employed in approxi-mately stoichiometric properties i.e. corresponding to 1 mole of phosphite (III) for each mole of a monosul-fonyl isocyanate (II; $n=1$), 2 moles of phosphite (III) for each mole of a disulfonylisocyanate (II; $n=2$), or 3 moles of phosphite (III) for each mole of a trisulfonyl-isocyanate (II; $n=3$). Other proportions of reactants (II) and (III) can be employed if desired but offer no advantage in terms of time of reaction, yield, etc.

The reaction of the sulfonylisocyanate (II) and the phosphite (III) proceeds at room temperature (circa 25° C.) in certain cases but is generally carried out at ele-vated temperatures of the order of about 40° C. to about 200° C. and preferably of the order of about 50° C. to about 100° C. If desired, a catalyst, advantageously a tertiary organic amine such as trimethylamine, triethyl-amine, pyridine, N-methylaniline, and the like can be em-ployed in the reaction of the sulfonylisocyanate (II) and the phosphite (III) but the use of such a catalyst is optional and not essential.

The progress of the reaction can be followed by suit-able analytical procedures such as infrared spectrographic analysis in which case the completion of the reaction can be determined by the disappearance of those absorption bands characteristic of the isocyanate grouping.

The desired Compound I can be isolated from the re-sulting reaction mixture by conventional procedures. In many cases the Compound I separates from the reaction mixture as a solid and can be isolated by filtration, cen-trifugation, decantation and the like procedures. Alter-natively the inert organic solvent can be removed by evaporation to leave a residue of the desired product (I). Purification can be effected, if desired, by conven-tional procedures such as recrystallization in the case of solids, distillation in the case of liquids, countercurrent distribution, chromatography, and the like, or any com-bination of these procedures.

The salts of the compounds of Formula I can be pre-pared from the free form of said compounds by conven-tional procedures, for example by reaction of one equi-valent of the alkali metal (or an alkoxide or hydroxide thereof) or alkaline earth metal hydroxide, ammonia or organic amine with one equivalent of the free form of Compound I advantageously in solution in a suitable organic solvent such as methanol, ethanol, isopropanol, ether, tetrahydrofuran, and the like. The desired salt will generally separate from the resulting reaction mix-ture as a precipitate which can be isolated by filtration and the like, or said salt can be isolated from the re-action mixture by evaporation of the solvent.

The phosphites (III) which are employed as starting materials in preparing the novel Compound I of the invention are known compounds which can be prepared by procedures well-known in the art; see, for example, Van Wazer, Phosphorous and Its Compounds, vol. 1, p. 372 et seq., Interscience Publishers, New York, 1958.

The sulfonylisocyanates (II) which are employed as starting materials in preparing the novel Compound I of the invention are also, for the most part, known com-pounds which can be prepared by known procedures. For example, the sulfonylisocyanates (II) can be prepared by reaction of the corresponding sulfonamide with phosgene advantageously in the presence of a catalytic amount of an isocyanate using the procedures described and reviewed by Ulrich, Chemical Reviews, 65, 369, 1965.

The following examples describe the manner and process of making and using the invention and set forth the best mode contemplated by the inventors of carrying out the invention but are not to be construed as limiting.

Example 1.—Dimethyl p-tolylsulfonylcarbamoyl-phosphonate

A total of 5.5 g. (0.05 mole) of dimethylhydrogen phosphite was added slowly to a solution of 9.85 g. (0.05 mole) of p-toluenesulfonyl isocyanate (Ulrich, supra) in 100 ml. of benzene. The resulting mixture was heated under reflux for 5 hours at the end of which time the solvent was removed by evaporation. The residue (14.5 g.) was recrystallized from carbon tetrachloride to yield dimethyl p-tolylsulfonylcarbamoyl-phosphonate in the form of a solid having a melting point of 122 to 124° C. The infrared absorption spectrum (chloroform solu-tion) showed a maximum at $5.9\mu$. The nuclear magnetic resonance spectrum ($CDCl_3$ solution) showed singlet at 2.45 p.p.m. doublet at 3.88 p.p.m. A:B pattern at 7.35 and 7.98 p.p.m. ratio 3:6:4.

*Analysis.*—Calcd. for $C_{10}H_{14}NO_6PS$, N, 4.57; P, 10.01. Found: N, 4.84; P, 9.36.

Example 2.—Dimethyl p-tolysulfonylcarbamoyl-phosphonate

A solution of 394 g. (2 mole) of p-toluenesulfonyl iso-cyanate in 500 ml. of carbon tetrachloride was treated dropwise, with stirring, over a period of about 0.75 hours with a total of 220 g. (2 mole) of dimethyl hydrogen phosphite. The temperature of the reaction mixture rose from an initial value of 24° C. to a maximum of 65° C. After the addition was complete the resulting mixture was stirred for a further 45 minutes. The solid which had separated was then isolated by filtration, washed with carbon tetrachloride and dried. There was thus obtained 564 g. (92% theoretical yield) of dimethyl p-tolulsul-fonylcarbamoylphosphonate in the form of a crystalline solid having a melting point of 127 to 128° C.

Example 3.—Dimethyl p-tolylsulfonylcarbamoyl-phosphate

A total of 1.1 g. (0.01 mole) of dimethyl hydrogen phosphite was added to a solution of 1.97 g. of (0.01 mole) of p-toluenesulfonyl isocyanate in 100 ml. of car-bon tetrachloride and one drop of triethylamine was added to the resulting mixture. The mixture so obtained was stirred for 19.5 hours at room temperature and the solid which had separated was isolated by filtration, washed with carbon tetrachloride and dried. There was thus obtained 2.35 g. (76.5% theoretical yield) of dimethyl p-tolylsulfonylcarbamoylphosphonate having a melting point of 125 to 128° C.

Example 4.—Dimethyl p-fluorobenzenesulfonylcarbamoylphosphonate

A mixture of 6.03 g. (0.03 mole) of p-fluorobenzenesulfonyl isocyanate (Ulrich, supra) and a 3.3 g. (0.03 mole) of dimethyl hydrogen phosphite in 60 ml. of carbon tetrachloride was heated under reflux for 2 hours. The resulting mixture was cooled in ice water and the solid which separated was isolated by filtration, washed with carbon tetrachloride and dried. There was thus obtained 7.5 g. (80.4% theoretical yield) of dimethyl p-fluorobenzenesulfonylcarbamoylphosphonate in the form of a crystalline solid having a melting point of 131 to 133° C.; this material had an infrared absorption spectra exhibiting a maximum at 5.9μ and a nuclear magnetic resonance spectrum with doublet 3.9 p.p.m. ABX patterns at 7.3 and 8.1 p.p.m. ratio=6:4.

Example 5.—Dimethyl benzenesulfonylcarbamoylphosphonate

A mixture of 1.83 g. (0.01 mole) of benzenesulfonyl isocyanate (Ulrich, supra), 1.1 g. (0.01 mole of dimethyl hydrogen phosphite and 100 ml. of carbon tetrachloride was heated under reflux for 90 minutes and then allowed to cool to room temperature (about 20° C.). The solid which separated was isolated by filtration. There was thus obtained 2.05 g. (70% theoretical yield) of dimethyl benzenesulfonylcarbamoylphosphonate in the form of a crystalline solid having a melting point of 125 to 130° C. This material had an infrared absorption spectra (in CHCl$_3$ solution) which exhibited a maximum at 5.9μ.

Example 6.—Dimethyl p-nitrobenzenesulfonylcarbamoylphosphonate

A total of 1.1 g. (0.01 mole) of dimethyl hydrogen phosphite was added to a solution of 2.28 g. (0.01 mole) of p-nitrobenzenesulfonyl isocyanate (Ulrich, supra) in 100 ml. of carbon tetrachloride. The resulting mixture was heated under reflux for 15 minutes before being cooled to room temperature (circa 20° C.). The solid which separated was isolated by filtration. There was thus obtained 2.76 g. (81.5% theoretical yield) of dimethyl p-nitrobenzenesulfonylcarbamoylphosphonate in the form of a crystalline solid having a melting point of 155 to 185° C. The latter material had an infrared absorption spectra (potassium bromide pellet) exhibiting a maximum at 5.85μ.

Example 7.—Dimethyl p-methoxybenzenesulfonylcarbamoylphosphonate

A mixture of 12.78 g. (0.06 mole) of p-methoxybenzenesulfonyl isocyanate (Ulrich, supra) and 6.6 g. (0.06 mole) of dimethyl hydrogen phosphite in 130 ml. of carbon tetrachloride was heated under reflux for 2 hours. The resulting mixture was cooled in ice water and the solid which separated was isolated by filtration. There was thus obtained 16.6 g. (85.6% theoretical yield) of dimethyl p-methoxybenzenesulfonyl isocyanate in the form of a crystalline solid having a melting point of 128 to 135° C. This material had an infrared absorption spectra (in CHCl$_3$ solution) which exhibited a maximum at 5.9μ.

Example 8.—Dimethyl p-chlorobenzenesulfonylcarbamoyl phosphonate

A mixture of 15.2 g. (0.07 mole) of p-chlorobenzenesulfonyl isocyanate (Ulrich, supra) and 8.47 g. (0.07 mole) of dimethyl hydrogen phosphite in 150 ml. of carbon tetrachloride was heated under reflux for 1 hour at 80° C. The reaction mixture so obtained was cooled in ice water and the solid which separated was isolated by filtration, washed with carbon tetrachloride and dried. There was thus obtained 18 g. (78.5% theoretical yield) of dimethyl p-chlorobenzenesulfonylcarbamoyl phosphonate in the form of a crystalline solid having a melting point of 137 to 139° C. This material had an infrared absorption spectra (chloroform solution) exhibiting a maximum at 5.9μ.

Example 9.—Dimethyl p-bromobenzenesulfonylcarbamoylphosphonate

A mixture of 15.7 g. (0.06 mole) of p-chlorobenzenesulfonyl isocyanate (Ulrich, supra) and 7.26 g. (0.06 mole) of dimethyl hydrogen phosphite in 150 ml. of carbon tetrachloride was heated under reflux for 2 hours. The resulting mixture was cooled in ice water and the solid which separated was isolated by filtration. There was thus obtained 16.7 g. (75% theoretical yield) of dimethyl p-bromobenzenesulfonylcarbamoyl phosphonate in the form of a crystalline solid having a melting point of 130 to 132° C. This material had infrared absorption spectrum (chloroform solution) exhibiting a maximum of 5.9μ.

Example 10.—Dimethyl 3,4-dichlorobenzenesulfonylcarbamoyl phosphonate

A mixture of 7.56 g. (0.03 mole) of 3,4-dichlorobenzenesulfonyl isocyanate (Ulrich, supra) and 3.63 g. (0.033 mole) of dimethyl hydrogen phosphite in 75 ml. of carbon tetrachloride was refluxed over a period of 1.5 hours. The resulting mixture was cooled in ice water and the solid which separated was isolated by filtration. There was thus obtained 9 g. (83.3% theoretical yield) of dimethyl 3,4-dichlorobenzenesulfonylcarbamoyl phosphonate in the form of a crystalline solid having a melting point of 141 to 143° C. The infrared spectrum (chloroform solution) of this compound exhibited a maximum at 5.9μ.

Example 11.—Dimethyl 2,5-dichlorobenzenesulfonylcarbamoyl phosphonate

A solution of 7.56 g. (0.03 mole) of 2,5-dichlorobenzenesulfonyl isocyanate (Ulrich, supra) and 3.63 g. (0.033 mole) of dimethyl hydrogen phosphite in 75 ml. of carbon tetrachloride was heated under reflux for 40 minutes. The resulting mixture was cooled in ice water and the solid which separated was isolated by filtration. There was thus obtained 9.7 g. (90.2% theoretical yield) of dimethyl 2,5-dichlorobenzenesulfonylcarbamoyl phosphonate in the form of a crystalline solid having a melting point of 163 to 164° C. The infrared spectrum (chloroform solution) exhibited a maximum at 5.9μ.

Example 12.—Tetramethyl 2-methylbenzene-1,4-bis(sulfonylcarbamoylphosphonate)

Using the procedure described in Example 4, but replacing p-fluorobenzenesulfonyl isocyanate by the equivalent amount of 2-methylbenzene-1,4-bis(sulfonyl isocyanate) (Ulrich, supra) and using double the amount of dimethyl hydrogen phosphite, there is obtained tetramethyl 2-methylbenzene-1,4-bis(sulfonylcarbamoylphosphonate).

Example 13.—Diisopropyl p-tolylsulfonylcarbamoylphosphonate

Using the procedure described in Example 1, but replacing dimethyl hydrogen phosphite by diisopropyl hydrogen phosphite, there is obtained diisopropyl p-tolylsulfonylcarbamoylphosphonate.

Similarly, using the procedure described in Example 1, but replacing dimethyl hydrogen phosphite by dioctyl hydrogen phosphite, methyl ethyl hydrogen phosphite, diisobutyl hydrogen phosphite, diallyl hydrogen phosphite, di-2-octenyl hydrogen phosphite, dibenzyl hydrogen phosphite, di - (2-naphthylmethyl) - hydrogen phosphite, diphenyl hydrogen phosphite, di-o-tolyl hydrogen phosphite, di(2-naphthyl) hydrogen phosphite, dicyclopentyl hydrogen phosphite, dicyclohexyl hydrogen phosphite, di(2-cyclohexenyl) hydrogen phosphite, 1,3,2-dioxaphospholane 2-oxide (Lucas et al. J. Am. Chem. Soc., 72, 5491, 1950), and 1,3,2-dioxaphosphorinane 2-oxide (Lucas, supra) there are obtained dioctyl, O-ethyl-O-methyl, diisobutyl, diallyl, di-2-octenyl, dibenzyl, di-(2-naphthylmethyl), di-phenyl, di-o-tolyl, di-(2-naphthyl), dicyclopentyl, dicyclohexyl, di(2 - cyclohexenyl), O,O'-ethylene and O,O'-trimethylene p-tolylsulfonylcarbamoylphosphonates, respectively.

Example 14.—Dimethyl p-allylbenzene-sulfonylcarbamoylphosphonate

Using the procedure described in Example 4, but replacing p-fluorobenzenesulfonyl isocyanate by p-allylbenzenesulfonyl isocyanate (prepared from p-allylbenzenesulfonamide using the procedure of Ulrich, supra), there is obtained dimethyl p-allylbenzenesulfonylcarbamoylphosphonate.

Example 15.—Dimethyl p-allyloxybenzene-sulfonylcarbamoylphosphonate

Using the procedure described in Example 4, but replacing p-fluorobenzenesulfonyl isocyanate by p-allyloxybenzenesulfonyl isocyanate (prepared from p-allyloxlybenzenesulfonamide using the procedure of Ulrich, supra) there is obtained dimethyl p-allyloxybenzenesulfonylcarbamoylphosphonate.

Example 16.—Dimethyl m-methylmercaptobenzene-sulfonylcarbamoylphosphonate

Using the procedure described in Example 4, but replacing p-fluorobenzenesulfonyl isocyanate by m-methylmercaptobenzene sulfonyl isocyanate (prepared from m-methylmercaptobenzenesulfonamide using the procedure described by Ulrich, supra), there is obtained dimethyl m-methylmercaptobenzenesulfonylcarbamoylphosphonate.

Example 17.—Dimethyl p-cyanobenzenesulfonyl-carbamoylphosphonate

Using the procedure described in Example 4, but replacing p - fluorobenzenesulfonyl isocyanate by p - cyanobenzenesulfonyl isocyanate (prepared from p-cyanobenzenesulfonamide using the procedure described by Ulrich, supra), there is obtained dimethyl - p - cyanobenzenesulfonylcarbamoylphosphonate.

Example 18.—Dimethyl 2-naphthylsulfonylcarbamoylphosphonate

Using the procedure described in Example 4, but replacing p-fluorobenzenesulfonyl isocyanate by 2-naphthylsulfonyl isocyanate (prepared from 2-naphthylsulfonamide using the procedure described by Ulrich, supra), there is obtained dimethyl 2 - naphthylsulfonylcarbamoylphosphonate.

Similarly, using the procedure described in Example 4, but replacing p - fluorobenzenesulfonyl isocyanate by p - iodobenzenesulfonyl isocyanate, 2-methyl-4-isopropylbenzenesulfonyl isocyanate, 2-methyl-4-bromobenzenesulfonyl isocyanate, 2,4-dimethyl-5-ethylbenzenesulfonyl isocyanate, 3,4 - diethoxybenzenesulfonyl isocyanate, 3,4,5-trimethoxybenzenesulfonyl isocyanate, and 2 - bromo-4-allylbenzenesulfonyl isocyanate (all of which sulfonyl isocyanates are prepared from the corresponding sulfonamides using the procedure of Ulrich, supra) there are obtained dimethyl p - iodobenzenesulfonylcarbamoylphosphonate, 2-methyl-4-isopropylbenzenesulfonylcarbamoylphosphonate, 2-methyl-4-bromobenzenesulfonylcarbamoylphosphonate, 2,4 - dimethyl-5-ethylbenzenesulfonylcarbamoylphosphonate, 3,4-diethoxybenzenesulfonylcarbamoylphosphonate, 3,4,5-trimethoxybenzenesulfonylcarbamoylphosphonate, and 2-bromo-4-allylbenzenesulfonylcarbamoylphosphonate, respectively.

Example 19

This example illustrates the high order of activity of a representative member of the compounds of the invention, namely dimethyl p-tolylsulfonylcarbamoylphosphonate, against a broad spectrum of plant pathogenic fungi.

Batches of molten, nutrient agar culture medium containing dimethyl-p-tolylsulfonylcarbamoylphosphonate at concentrations of 100 and 500 p.p.m. were prepared and poured into a series of Petri dishes. When the agar had solidified in the dishes, discs of test organisms were cut from cultures actively growing on agar and were used to inoculate the various plates containing agar treated with test compound. Control plates (agar not treated with test compound) were also inoculated in the same manner. The inoculated plates were incubated at room temperature (circa 25° C.) and the colony diameters were measured periodically to determine the amount of inhibition produced by the test compound. When the mycelial growth in the control colonies had reached a diameter of 50 mm. the percentage inhibition of the corresponding organism produced by the test compound was calculated from the observed diameter of the mycelial growth of the same organism growing in the presence of test compound. The percentage inhibition, so calculated for each organism, is recorded in Table I.

TABLE I

| Test organism | Percent inhibition at each concentration of test compound, p.p.m. | |
|---|---|---|
| | 100 | 500 |
| Alternaria solani | 71 | 69 |
| Botrytis cinerea | 76 | 86 |
| Candida sp | 71 | 100 |
| Cephalosporium sp | 78 | 100 |
| Cladosporium sp | 67 | 76 |
| Fusarium oxysporum f. lycopersici | 46 | 99 |
| Fusarium oxysporum f. cubense | 53 | 100 |
| Fusarium roseum | 36 | 80 |
| Glomerella cingulata | 76 | 95 |
| Helminthosporium sp | 78 | 100 |
| Monilinia fructicola | 98 | 100 |
| Penicillium patulum | 49 | 97 |
| Phytophthora cinnamomi | 98 | 100 |
| Pythium ultimum | 100 | 100 |
| Rhizoctonia solani | 100 | 100 |
| Sclerotinia sclerotiorum | 94 | 100 |
| Stemphylium sarcinaeforme | 20 | 62 |
| Thielaviopsis sp | 82 | 98 |
| Trichoderma sp | 81 | 98 |
| Verticillium albo-atrum | 39 | 79 |

We claim:

1. A compound having the formula:

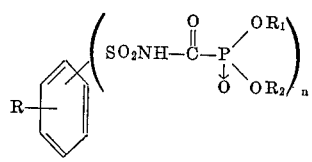

wherein $R_1$ and $R_2$ taken individually represent lower hydrocarbyl and $R_1$ and $R_2$ taken together represent alkylene from 2 to 10 carbon atoms, inclusive, bridging the oxygen atoms to which $R_1$ and $R_2$ are attached, $n$ is an integer from 1 to 3 and R represents from 0 to 3 substituents selected form the group consisting of halo, lower-alkyl, lower-alkenyl, lower-alkoxy, lower-alkenyloxy, lower-alkylmercapto, nitro, cyano, and benzo.

2. A compound of claim 1 wherein $R_1$ and $R_2$ each represent methyl, $n$ is 1 and R is p-methyl, which compound is dimethyl p-tolylsulfonylcarbamoyl phosphate.

3. A compound of claim 1 wherein $R_1$ and $R_2$ each represent methyl, $n$ is 1 and R is p-fluoro, which compound is dimethyl p-fluorobenzenesulfonylcarbamoylphosphonate.

4. A compound of claim 1 wherein $R_1$ and $R_2$ each represent methyl $n$ is 1 and R is hydrogen, which compound is dimethyl benzenesulfonylcarbamoylphosphonate.

5. A compound of claim 1 wherein $R_1$ and $R_2$ each represent methyl, $n$ is 1 and R is p-nitro, which compound is dimethyl p-nitrobenzenesulfonylcarbamoylphosphonate.

6. A compound of claim 1 wherein $R_1$ and $R_2$ each represent methyl, $n$ is 1, and R is p-methoxy, which compound is dimethyl p-methoxybenzenesulfonylcarbamoylphosphonate.

7. A compound of claim 1 wherein $R_1$ and $R_2$ each represent methyl, $n$ is 1, and R is p-chloro, which compound is dimethyl p-chlorobenzenesulfonylcarbamoylphosphonate.

8. A compound of claim 1 wherein $R_1$ and $R_2$ each represent methly, $n$ is 1, and R is p-bromo, which compound is dimethyl p-bromobenzenesulfonylcarbamoylphosphonate.

9. A compound of claim 1 wherein $R_1$ and $R_2$ each represent methyl, $n$ is 1 and R is 3,4-dichloro, which compound is dimethyl 3,4-dichlorobenzenesulfonylcarbamolyphosphonate.

10. A compound of claim 1 wherein $R_1$ and $R_2$ each represent methyl, $n$ is 1, and R is 2,5-dichloro, which compound is dimethyl 2,5-dichlorobenzenesulfonylcarbamoylphosphonate.

References Cited

UNITED STATES PATENTS 2,909,558   10/1959   Reetz _____ 260—943

CHARLES B. PARKER, *Primary Examiner.*

R. L. RAYMOND, *Assistant Examiner.*